United States Patent
Alfvén et al.

(10) Patent No.: US 7,755,321 B2
(45) Date of Patent: Jul. 13, 2010

(54) METHOD AND APPARATUS FOR BATTERY REMOVAL DETECTION

(75) Inventors: Johan Alfvén, Lund (SE); Turan Caliskan, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 169 days.

(21) Appl. No.: 12/047,689

(22) Filed: Mar. 13, 2008

(65) Prior Publication Data

US 2009/0230778 A1    Sep. 17, 2009

(51) Int. Cl.
*H02J 7/00*    (2006.01)
(52) U.S. Cl. .................. 320/106; 320/DIG. 12
(58) Field of Classification Search ........... 320/106, 320/DIG. 12; 340/636.1–636.21
See application file for complete search history.

(56) References Cited

U.S. PATENT DOCUMENTS

| | | | | |
|---|---|---|---|---|
| 5,764,035 A * | 6/1998 | Lee | .......................... | 320/160 |
| 6,023,147 A * | 2/2000 | Cargin et al. | ................ | 320/114 |
| 6,087,803 A * | 7/2000 | Eguchi et al. | ............... | 320/106 |
| 6,150,796 A * | 11/2000 | Ford | ........................... | 320/128 |
| 6,340,876 B1 * | 1/2002 | Saint-Pierre | ................ | 320/106 |
| 6,760,618 B1 * | 7/2004 | Inoue | .......................... | 604/20 |
| 6,898,156 B1 * | 5/2005 | Nakamiya et al. | ........... | 368/204 |
| 2007/0046106 A1 * | 3/2007 | Shintomi | .................... | 307/64 |

FOREIGN PATENT DOCUMENTS

| | | |
|---|---|---|
| KR | 10-2006-0040165 | 5/2006 |
| WO | 2007/006846 | 1/2007 |

* cited by examiner

*Primary Examiner*—Edward Tso
*Assistant Examiner*—Manuel Hernandez
(74) *Attorney, Agent, or Firm*—Renner, Otto, Boisselle & Sklar, LLP

(57) ABSTRACT

The present invention relates to a method for battery removal detection in a portable communication device and also to a portable communication device comprising a detection circuit. During start-up of the portable communication device the detection circuit is powered on and a first input of the detection circuit is set to a first logical level and a second input of the detection circuit is set to a second logical level. An output from the detection circuit is fed to a third input of the detection circuit and a new output value for the detection circuit is generated based on the first, second and third input and the new value of the output is stored in a memory means.

12 Claims, 1 Drawing Sheet

METHOD AND APPARATUS FOR BATTERY REMOVAL DETECTION

TECHNICAL FIELD OF THE INVENTION

The present invention relates to the field of portable communication devices and more particularly to a portable communication device comprising a detection circuit for detecting if a battery has been removed from the portable communication device. Furthermore, the present invention relates to a method for detecting if the battery has been removed from the portable communication device.

DESCRIPTION OF RELATED ART

Portable communication devices like cellular telephones comprise a battery or batteries serving as a power supply. The batteries are often rechargeable and may be charged with the battery still inserted in the portable communication device, but also sometimes when they have been disengaged from the portable communication device. If the battery is removable it would be desirable to be able to detect if the battery has been removed from the device or not.

The main reason today for detecting a removal of the battery is to preserve the battery power when the battery is removed from and not used by the portable communication device. Since batteries of today usually contain electronics such as safety circuits, transistors and the like they also consume power when they are disconnected from its device. To be able to shut down or switch off these components the removal of the battery must be detected.

One solution to this problem is to use a simple mechanical on-off switch to detect the battery removal. However, adding a mechanical switch to the battery will increase the number of parts of the battery and thus add costs and increase the complexity of the battery.

Another way to solve the problem is to build in an electronic solution in the battery. This solution could use already existing electronic parts of the battery and/or use a software-based solution. Different such solutions for electronically detecting battery removal are known today.

However, the battery removal detection of today focuses mainly on battery preserving or safety aspects. It also focuses on the battery and not on the portable communication device. That is the portable device itself does not know if the battery has been removed from it or not. To be able to detect if the battery has been removed, will be an important feature in the future. This may not only be important in order to give a user of the portable communication device a greater service, but could also be useful as a part for detecting other functions of the telephone.

SUMMARY OF THE INVENTION

The present invention is directed towards solving the problem of detecting if a battery of a portable communication device has been removed from it or not.

One object of the present invention is to provide a method for detecting if the battery has been removed from the portable communication device.

A second object of the present invention is to provide a portable communication device having improved features for detecting the removal of the battery.

According to a first aspect of the present invention this is achieved with a method comprising the following steps:

powering on a detection circuit during start-up of the portable communication device;

setting a first input of the detection circuit to a first logical level;

setting a second input of the detection circuit to a second logical level;

feeding an output from the detection circuit to a third input of the detection circuit;

generating a new output value for the detection circuit based on the first, second and third input, and saving the new value of the output in a memory means.

A second aspect of the present invention is directed towards a method including the features of the first aspect and further comprising the step of setting the second input of the detection circuit to the first logical level once the value of the new output has been saved.

A third aspect of the present invention is directed towards a method including features of the previous aspects, comprising the step of feeding the detection circuit with enough power to hold the value of the output when the portable communication device is switched off and its battery is in place.

A fourth aspect of the present invention is directed towards a method including features of the first and second aspect comprising the step of turning off the power supply to the detection circuit when the battery of the portable communication device is removed and thus setting the output value to the second logical level.

A fifth aspect of the present invention is directed towards a method including features of the previous aspects, wherein the step of setting the first input of the detection circuit to a first logical level comprises feeding a level shifted battery voltage to said input.

A sixth aspect of the present invention is directed towards a method including features of the previous aspects, wherein the step of setting the second input of the detection circuit to the second logical level comprises feeding a voltage from a voltage regulator, which is turned off during start-up of the portable communication device.

According to a seventh aspect the object is achieved by a portable communication device comprising a battery and a detection circuit for detecting if the battery has been removed from the portable communication device, wherein the detection circuit comprises a first input connected to the battery and a second input connected to an adjustable power supply configured to output a second logical level during startup of the portable communication device.

An eighth aspect of the present invention is directed towards a portable communication device including the features of the seventh aspect, wherein the output of said detection circuit is connected to the third input of the detection circuit.

A ninth aspect of the present invention is directed towards a portable communication device including the features of the eighth aspect, further comprising generating means for generating a new output based on the first, second and third input of the detection circuit.

A tenth aspect of the present invention is directed towards a portable communication device including the features of the ninth aspect, further comprising memory means for storing the value of the new output.

An eleventh aspect of the present invention is directed towards a portable communication device including the features of any of the seventh to tenth aspect, wherein the detection circuit comprises an AND-gate and an OR-gate.

A twelfth aspect of the present invention is directed towards a portable communication device including the features of the eleventh aspect, wherein the first and the third input of the detection circuit are inputs to the AND-gate.

A thirteenth aspect of the present invention is directed towards a portable communication device including the features of the twelfth aspect, wherein the second input of the detection circuit and the output of the AND-gate are inputs to the OR-gate.

A fourteenth aspect of the present invention is directed towards a portable communication device including the features of the thirteenth aspect, wherein the output of the OR-gate is the output of the detection circuit.

A fifteenth aspect of the present invention is directed towards a portable communication device including the features of any of the eighth to the fourteenth aspect, wherein the output is connected to a pull down resistor for defining the logic output during start-up of the portable communication device.

The invention has many advantages. For instance, it is now possible to know if a battery has been removed from the portable communication device or not. This is not only beneficial for service purposes, but could also be used as a base for detecting if other features are present in the portable communication device.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figures 1, 2:
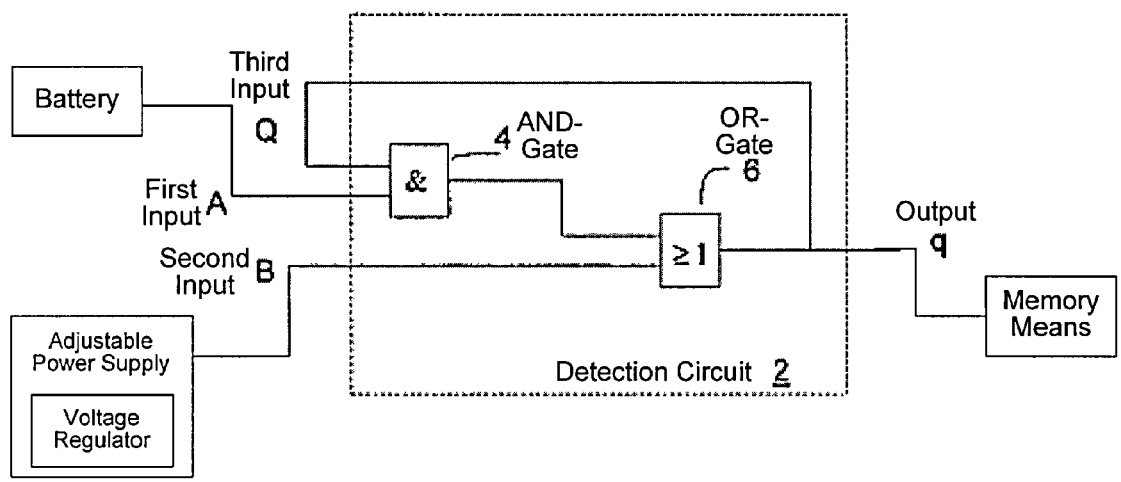
FIG. 1 schematically shows the configuration of a detection circuit, which is incorporated in the portable communication device.
FIG. 2 is a truth table for the detection circuit depicted in FIG. 1.

A portable communication device according to the present invention will now be described in relation to a cellular telephone, which is a preferred variation of the invention. However, the portable communication device can also be another type of device, like a cordless telephone, a communication module, a PDA or a lap top computer or any other type of portable device communicating with radio waves and using a battery as a power supply.

FIG. 1 schematically shows the configuration of a detection circuit 2, which is incorporated in the portable communication device. In a preferred embodiment of the present invention the detection circuit 2 is incorporated in a cellular telephone, including input/output devices such a number of keys on a keypad, a display, a loud speaker and a microphone. These are all common features for a portable communication device and are well known by a person skilled in the art and are therefore not shown or described in detail.

The detection circuit 2, depicted in FIG. 1 comprises an AND-gate 4 and an OR-gate 6. The AND-gate 4 has two inputs A and Q. In this preferred embodiment of the present invention the input A to the AND-gate 4 also constitutes the first input A to the detection circuit 2. The OR-gate 6 also has two inputs, namely B and the output from the AND-gate 4. B also constitutes the second input to the detection circuit 2. The output q of the OR-gate 6 is used as the input Q to the AND-gate 4 and constitutes the third input to the detection circuit 2.

The input A is connected to the battery of the portable communication device. Depending on the voltage of the battery the connection may either be directly or via suitable circuitry for outputting a level shifted voltage. The design of such circuitries is considered to be known by a person skilled in the art and are therefore not described in any more detail. The important parameter is that the voltage supplied to the input A essentially corresponds to the Input/Output voltage used for the platform of the portable communication device. In a preferred embodiment using a cellular telephone as the portable communication device, the level shifted voltage supplied to the first input A of the detection circuit 2 is 1.8 Volt. In this case 1.8 Volt will define a logical one. However, it should be understood that in context with the present invention it would also be possible to define all logical ones as logical zeros and all logical zeros as ones and adapt the circuits to that fact. Thus, it would be possible to detect the removal of the battery from the portable communication device according to another but equivalent truth table to the one depicted in FIG. 2.

Thus, in a preferred embodiment of the present invention the first input A of the detection circuit 2 will be a logical one as long as the battery is present in the portable communication device and consequently a logical zero when the battery is removed from its place.

The second input B of the detection circuit 2 is connected to an adjustable power supply. The adjustable power supply may be a controlled voltage regulator, which could be present on a power management ASIC (Application Specific Integrated Circuit) or be a separate voltage regulator. In a preferred embodiment of the present invention the input B is taken from a voltage regulator that already is present and is used for other purposes in the portable communication device. By using already exiting components of the portable communication device it is possible to reduce costs and implement the present invention in the portable communication device to a very low cost.

The voltage regulator is configured in such a way that it will output zero Volts during start-up of the portable communication device. The reason for this will be explained in detail below in conjunction with FIG. 2. Thus, during start-up of the portable communication device, the second input of the detection circuit 2 will be a logical zero.

The third input Q of the detection circuit 2 is the feedback of output q of the detection circuit 2. The level of the third input varies depending on if the battery has been removed or not during the period when the portable communication device has been switched-off. The output q is connected to a pull-down resistor (not shown) to define the logical output of the signal q at start-up of the portable communication device and at battery insertion. The use of pull-down resistors is well known to a person skilled in the art and is therefore not described in greater detail here. In a preferred embodiment of the present invention the pull-down resistor is at least 220 kohm, preferably 470 kohm in order to minimize the leakage current. It is also possible to use a pull-up resistor if another logical level should be defined.

Turning now to FIG. 2 the method for subsequently detecting if the battery has been removed from the portable communication device will be described. The method starts when the switched-off portable communication device is turned on again. The first step is powering on the detection circuit 2.

Since the battery now is inserted in the portable communication device (else it would not be possible to turn on the portable communication device) the first input A of the detection circuit 2 will be a logical one as described above. The second input B of the detection circuit 2 will be a logical zero during start-up as explained above, i.e. the output of the voltage regulator connected to the second input is turned off or supplying a zero voltage level. The third input Q is the feedback of the output signal q of the detection circuit 2. The signal q and thus the third input Q will vary depending on if the battery has been removed or not. If the battery has been removed, the signal q will be equal to zero and if it has not been removed it will be one.

Now, turning to the truth table of FIG. 2, it should be understood that it is only of theoretical interest what the output q is when the first input A of the detection device 2 is zero, i.e. when the battery is removed from the portable communication device. When the battery is removed there is now power supply to the detection circuit 2. Thus, in a theoretical sense, the output q will be zero if both the first A and second B input is zero. If the first input A is zero and the second input is one, the output q will vary depending on if the detection circuit is powered on or not, this is marked as x in the truth table.

Now turning to the two events of the truth table were the first input A is a logical 1, i.e. when the battery is inserted in the portable communication device. In the first event of the two the second input B is set to zero. This event will occur during start-up of the portable communication device. Since the first input A is set to one and the second input B is set to zero the output q of the detection circuit 2 will be the output q itself. As will be described in detail below q will be zero if the battery has been removed from the portable communication device and one if the battery has not been removed. The output q generated in this way during start up of the portable communication device will be stored in some type of memory means, preferably such memory means that are already present in the portable communication device. The storing of these start-up values will create a log showing if the battery has been removed when the portable communication device has been switched-off. This log may then be used later by for instance by service personal when the portable communication device is serviced, maintained or repaired.

For the second of the above mentioned events the first input A of the detection circuit 2 is as mentioned one and the second input B is also one. This will occur after the initial start-up of the portable communication device, after the start-up value for q has been stored in the memory means. When both the first A and the second B input of the detection device 2 are one the output q will always be one. This indicates that the battery is in place in the portable communication device.

When the portable communication device now is turned off the following will happen. If the battery is not removed from the portable communication device the battery will be feeding the detection circuit 2 with enough power to hold the value of the output (q) at its present value, i.e. one. If the portable communication device now is turned-on again, i.e. without that the battery has been removed during the period when the portable communication device was switched off, the inputs of the detection circuit 2 will be A=1, B=0 and Q=1. Thus, the new start-up value to be saved in the memory means will be one, indicating that the battery has not been removed during the period when the portable communication has been turned off.

However, if the battery has been removed from the portable communication device, the power supply to the detection circuit 2 will be interrupted or turned off and the output q of the detection circuit 2 will go from one to zero. Putting back the battery in place of the portable communication device will not effect the output q, which will remain zero.

When the portable communication device is started once again q will be zero and thus this value will be stored in the memory means before the second input B of the detection circuit 2 will be set to one, which in turn sets the output q to one.

The portable communication device according to the present invention can be varied in a number of ways apart from what has been disclosed above. For example, the whole detection circuit can be realized as an ASIC including a pull-down resistor or if preferred a pull-up resistor. It shall also be understood that even if the present invention has been described with preferred embodiments having certain features it is obvious to a person skilled in the art that individual features in one embodiment could be combined with other embodiments or other individual features in other embodiments.

The invention claimed is:

1. Method for detecting if a battery has been removed from a portable communication device during the time when it has been switched off, comprising the steps of:
    powering on a detection circuit during start-up of the portable communication device;
    setting a first input of the detection circuit to a first logical level;
    setting a second input of the detection circuit to a second logical level;
    feeding an output from the detection circuit to a third input of the detection circuit;
    generating a new output value for the detection circuit based on the first, second and third input, and
    storing the new value of the output as a log in a memory means.

2. Method for detecting if the battery has been removed from the portable communication device according to claim 1, further comprising the step of:
    setting the second input of the detection circuit to the first logical level once the value of the new output has been saved.

3. Method for detecting if the battery has been removed from the portable communication device according to claim 1, comprising the step of:
    feeding the detection circuit with enough power to hold the value of the output when the portable communication device is switched off and its battery is in place.

4. Method for detecting if the battery has been removed from the portable communication device according to claim 1, comprising the step of:
    turning off a power supply to the detection circuit when the battery of the portable communication device is removed and setting the output value to the second logical level.

5. Method for detecting if the battery has been removed from the portable communication device according to claim 1, wherein the step of setting the first input of the detection circuit to the first logical level comprises feeding a level shifted battery voltage to said input.

6. Method for detecting if the battery has been removed from the portable communication device according to claim 1, wherein the step of setting the second input of the detection circuit to the second logical level comprises feeding a voltage from a voltage regulator, which is turned off during start-up of the portable communication device.

7. Portable communication device comprising a battery and a detection circuit for subsequently detecting if the battery has been removed from the portable communication device during the time when it has been switched off, wherein the detection circuit comprises a first input connected to the battery and a second input connected to an adjustable power supply configured to output a second logical level during startup of the portable communication device and an output connected to a third input of the detection circuit and is configured to generate a new output based on the first, second and third inputs of the detection circuit and to store the value of the new output as a log in a memory means.

8. Portable communication device according to claim 7, wherein the detection circuit comprises an AND-gate and an OR-gate.

9. Portable communication device according to claim 8, wherein the first and the third input of the detection circuit are inputs to the AND-gate.

10. Portable communication device according to claim 9, wherein the second input of the detection circuit and the output of the AND-gate are inputs to the OR-gate.

11. Portable communication device according to claim 10, wherein the output of the OR-gate is the output of the detection circuit.

12. Portable communication device according to claim 7, wherein the output is connected to a pull down resistor for defining the logic output during start-up of the portable communication device.

* * * * *